3,024,251
PROCESS FOR CLEANING APPARATUS
Jack B. Feder, Dumont, and Joseph L. Russell, Ridgewood, N.J., assignors to Scientific Design Company, Inc., a corporation of Delaware
No Drawing. Filed July 29, 1960, Ser. No. 46,052
7 Claims. (Cl. 260—346.8)

This invention relates to a process for the manufacture of maleic anhydride, more particularly to the removal of undesirable solid materials which accumulate in the apparatus so as to interfere with the process, and especially to such a cleaning process wherein the solid deposit is crude maleic acid which is removed by dissolving it in liquid maleic anhydride, with minimal interference in the manufacturing operation.

Maleic anhydride, a commercially important material, may be prepared by the catalytic partial oxidation of benzene or like hydrocarbon in the presence of a catalyst such as vanadia or the like which may be supported on a carrier. The hot gaseous reaction mixture may be cooled to partially condense some of the maleic anhydride, and the remainder may be absorbed in water to make maleic acid. The latter is converted to maleic anhydride by dehydration; e.g. by distillation in the presence of an azeotroping agent such as xylene or the like. In the partial condensation of the maleic anhydride, there is a build up of solids in relatively inaccessible places such as in the condenser tubes, and the art is confronted by the problem of providing methods for removing such deposits with minimal interference with the manufacturing operation in order to permit maximum use of and economy in the manufacturing equipment.

The discoveries associated with the invention and relating to the solution of the above problems, and the objects achieved in accordance with the invention as set forth herein include the following provision of:

The process of cleaning apparatus having thereon a solid deposit of crude maleic acid and tars which includes contacting said deposit with liquid maleic anhydride, whereby it is dissolved, and removing the resulting solution;

Such processes carried on at a temperature in the range of 53° C. to 200° C.;

Such processes wherein the contacting time is in the range of 10 to 2000 minutes;

Such processes using 0.3 to 99 parts by weight of maleic anhydride per part of deposit;

Such processes wherein the apparatus is a partial condenser made of ordinary steel and used for condensing maleic anhydride from a hot gaseous oxidation reaction mixture;

Such processes wherein the condenser has substantially vertical tubes surrounded by a cooling medium and the deposit is washed out by downward flow of liquid maleic anhydride;

Such processes wherein the washing is carried out simultaneously with flow of gases through the tubes;

And other objects which will be apparent as details or embodiments of the invention are set forth hereinafter.

In order to indicate still more fully the nature of the present invention, the following examples of typical procedures are set forth in which parts and percent mean part and percent by weight, respectively, unless otherwise indicated, it being understood that these examples are presented as illustrative only and are not intended to limit the scope of the invention.

*Example 1*

A benzene air mixture containing 1.21 mol percent of benzene is fed downward through a tubular reactor at a volume space velocity of 2500 (volume of feed gas per volume of catalyst per hour), at a reaction temperature of 365° C. (using a modified vanadia catalyst as described in the Robert B. Egbert and Mitchell Becker Patent 2,777,860, issued January 15, 1957).

The reactor tube may be of ⅞ inch internal diameter and the catalyst bed height may be 10 ft. The tube may be surrounded by a temperature regulating medium such as molten salt, molten metal or a copper jacket.

The gaseous reaction mixture is passed through a partial condenser containing one or more vertical tubes of about one inch internal diameter and about 8 feet in length. The tubes are surrounded by a temperature regulating medium maintained at about 55° C., e.g. circulating water. About two thirds of the maleic anhydride content of the gas is condensed and drains out as a liquid. The remainder of the gas is passed to a water scrubbing column or tower wherein it is contacted countercurrently with water or aqueous maleic acid, so as to provide a 40 percent by weight aqueous maleic acid solution.

This solution is dehydrated in a column in the presence of xylene as an azeotroping agent (the distilled water being removed and the xylene being recirculated as reflux to the column). A crude maleic anhydride material is removed as bottoms, and may contain up to about 20 percent xylene.

During this operation, there is a gradual build up of solid materials on the inside of the condenser tubes, and this causes an increase in the pressure drop through the condenser which eventually necessitates the removal of the condenser from service in order to restore its performance (by removal of the solids). A typical analysis of solids built up in this manner is

|   | Percent |
|---|---|
| Maleic acid | 59.2 |
| Maleic anhydride | 11.4 |
| Malic acid | 0.1 |
| Fumaric acid | 0.1 |
| Tar | 24.6 |

The liquid maleic anhydride condensate produced during the normal condenser operation contains maleic acid in an amount in the range of about 2 to 7 percent.

The condenser having the stated deposits therein is isolated from the operation and the deposits are flooded with molten maleic anhydride (either crude or purified) at a temperature of about 100° C. and this dissolves the crude maleic acid. The resulting solution is removed. Then the condenser is put back into operation, and performs in normal manner.

It is to be noted that this is a relatively simple and rapid means for cleaning the condenser which results in minimum down-time for the condenser.

This is a most surprising discovery, especially in view of the much slower and more cumbersome mechanical scraping or the like methods for removing such deposits, or the use of undesirable or contaminating solvents which have to be substantially completely removed before putting the apparatus back into operation.

Another important feature of the invention from the economic viewpoint is that ordinary steel may be used for the condenser tubes. This is in sharp contrast to methods employing aqueous washing agents which would rapidly corrode such steel, and therefore necessitate stainless steel for the tubes and other surfaces that contact the washing agent or the resulting solution.

*Example 2*

The procedure of Example 1 is repeated, except that the liquid maleic anhydride is applied as a spray or wash flowing downward in the condenser tubes (concurrent with the gases flowing therethrough while the condenser is in actual operation). Normally the cooling medium in the condenser jacket (surrounding the tubes) is maintained at a temperature of about 55° C. During this washing operation the molten maleic anhydride is applied at a temperature in a range of 53° to 90° C. in order to facilitate rapid removal of the deposit, inasmuch as solubility of maleic acid in molten maleic anhydride is higher at the higher temperatures. However, the temperature should not be so high as to cause undue isomerization of the maleic acid to fumaric acid. The latter forms a solid deposit which is much more difficult to remove.

Temperatures above 132° C. are particularly useful to the process of this invention inasmuch as maleic acid is molten at temperatures greater than 132° C. thereby increasing its rate of solution in the maleic anhydride. Heating to temperatures in excess of 132° C. without the presence of maleic anhydride will not accomplish removal of the tar components of the deposit.

However, heat alone will not remove solid maleic acid since under such conditions the acid isomerizes to fumaric acid and removal of the latter is even more difficult.

*Example 3*

A portion of a solid deposition obtained in a commercial plant from the liquid-gas separating chamber just below a partial condenser installation is heated with maleic anhydride to a temperature of 110° C. Forty-five minutes are required to achieve complete solution of the solid in the maleic anhydride, using seventy parts by weight of maleic anhydride per part of solid.

*Example 4*

A portion of solid deposition, similar to that of Example 3, is heated with maleic anhydride to a temperature of 135° C. Twenty minutes are required to achieve complete solution of the solid in the maleic anhydride, using the same proportions, as in Example 3.

Of course, in an Example 2 type of operation, there is an increased load on the scrubbers due in part to vaporization of added maleic anhydride, especially under the higher temperature conditions.

Comparable results to the foregoing are obtained with various modifications thereof including the following. The temperature at which the molten maleic anhydride is contacted with the solid deposit may be in the range of 53° to 200° C. desirably 90° to 180° C., and preferably 100° to 140° C. The contact time between the molten maleic anhydride and the deposit may be in the range of 10 to 2000 minutes. The proportion of molten maleic anhydride solvent to the amount of deposit may be in the range of 0.3 to 99 parts by weight and desirably 12 to 50 parts of maleic anhydride per part of deposit. The quantity of maleic anhydride used should be at least sufficient to solubilize all of the deposit (e.g., assuming the deposit to consist entirely of maleic acid) at the temperature of the washing operation. Amounts in excess of this minimum will serve to decrease the time required to achieve solution.

It is indeed surprising that the manufacture of maleic anhydride may be carried out in efficient manner in accordance with the invention with minimum down-time and minimum interference with the manufacturing operation by necessary cleaning or removal of solid deposits.

In view of the foregoing disclosures, variations and modifications thereof will be apparent to one skilled in the art and it is intended to include within the invention all such variations and modifications except as do not come within the scope of the appended claims.

What is claimed is:

1. A method of cleaning apparatus having a deposit thereon of crude maleic acid and tars which comprises contacting said deposit with liquid maleic anhydride, whereby it is dissolved, and removing the resulting solution.

2. A method of claim 1 carried out at a temperature in the range of 53° to 200° C.

3. A method of claim 2 wherein the contacting time is in the range of 10 to 2000 minutes.

4. A method of claim 1 using at least sufficient maleic anhydride to solubilize an amount of maleic acid equal to the weight of the deposit, at the temperature of the washing operation.

5. A method of claim 4 wherein the apparatus is a partial condenser used for condensing maleic anhydride from a hot gaseous oxidation reaction mixture.

6. A method of claim 5 wherein the condenser has substantially vertical tubes surrounded by a jacket containing a cooling medium and the deposit is washed out by downward flow of added liquid maleic anhydride within the tubes.

7. In a process for the manufacture of maleic anhydride wherein the hot gaseous reaction mixture obtained from a catalytic partial oxidation is passed to a partial condenser, and wherein crude maleic acid and tars deposit on said partial condenser, the improvement which comprises: contacting said deposits with liquid maleic anhydride, thereby dissolving said deposits; and simultaneously passing said reaction mixture through said partial condenser.

References Cited in the file of this patent
UNITED STATES PATENTS

| | | |
|---|---|---|
| 2,222,283 | Crowell | Nov. 19, 1940 |
| 2,777,860 | Egbert et al. | Jan. 15, 1957 |